(12) United States Patent
Laudani et al.

(10) Patent No.: US 12,065,183 B2
(45) Date of Patent: Aug. 20, 2024

(54) MODULAR EXTENDABLE TROLLEY

(71) Applicants: Carmelo Laudani, Kruszyn (PL);
Silvia Laudani, Boleslawiec (PL);
Massimo Campochiaro, Boleslawiec (PL)

(72) Inventors: Carmelo Laudani, Kruszyn (PL);
Silvia Laudani, Boleslawiec (PL);
Massimo Campochiaro, Boleslawiec (PL)

( * ) Notice: Subject to any disclaimer, the term of this patent is extended or adjusted under 35 U.S.C. 154(b) by 25 days.

(21) Appl. No.: 17/923,807

(22) PCT Filed: Nov. 17, 2020

(86) PCT No.: PCT/EP2020/082424
§ 371 (c)(1),
(2) Date: Nov. 7, 2022

(87) PCT Pub. No.: WO2021/233566
PCT Pub. Date: Nov. 25, 2021

(65) Prior Publication Data
US 2023/0174128 A1 Jun. 8, 2023

(30) Foreign Application Priority Data
May 20, 2020 (IT) ................................. 20175715.0

(51) Int. Cl.
*B62B 3/02* (2006.01)
(52) U.S. Cl.
CPC ............ *B62B 3/02* (2013.01); *B62B 2206/02* (2013.01); *B62B 2207/00* (2013.01)

(58) Field of Classification Search
CPC ... B62B 3/02; B62B 2206/02; B62B 2207/00; B62B 5/0083; B62B 3/0643; B62B 2203/10
(Continued)

(56) References Cited

U.S. PATENT DOCUMENTS 5,975,826 A * 11/1999 Scholder ................. B66C 23/48
414/490
9,308,928 B2 * 4/2016 Thorpe ................... B62B 5/067
(Continued)

FOREIGN PATENT DOCUMENTS

DE 202008012180 U1 * 1/2009 ............... B60D 1/00

OTHER PUBLICATIONS

Translation accessed at www.espacenet.com on Jan. 27, 2024. (Year: 2009).*

*Primary Examiner* — James A Shriver, II
*Assistant Examiner* — Hilary L Johns
(74) *Attorney, Agent, or Firm* — R. Ruschena Patent Agent, LLC

(57) ABSTRACT

A modular extendable trolley (100) including a front module (1) of a loading and unloading floor, a rear module (2) of the loading and unloading floor, a connection module (3) between the front module (1) and the rear module (2), four wheels (4, 40, 4', 40') for the movement of the trolley, a drawbar (10) to give direction to the trolley, a tow hook (11) for hooking an additional trolley into a train of trolleys, wherein the front module (1) and the rear module (2) of the loading and unloading floor comprise extensible side portions (1', 1", 2', 2") and the connection module (3) comprises a longitudinal portion (3') extendable to vary the dimensions of the trolley (100) itself.

6 Claims, 5 Drawing Sheets

(58) Field of Classification Search
USPC .......................................................... 280/651
See application file for complete search history.

(56) References Cited

U.S. PATENT DOCUMENTS

| | | | | |
|---|---|---|---|---|
| 9,694,838 | B2* | 7/2017 | Gullino | .................... B62D 1/14 |
| 10,266,095 | B1* | 4/2019 | Berg | ........................ B60P 3/14 |
| 10,543,862 | B1* | 1/2020 | Aguirre | ..................... B62B 5/06 |
| 11,052,808 | B2* | 7/2021 | Frizzell, III | ............ B60P 1/003 |
| 11,242,077 | B2* | 2/2022 | Salvacion | ............... B62B 3/102 |
| 2015/0175185 | A1* | 6/2015 | Thorpe | .................. B62B 3/027 |
| | | | | 280/491.1 |
| 2015/0360707 | A1* | 12/2015 | Gullino | ................ B62D 63/061 |
| | | | | 280/659 |
| 2018/0118535 | A1* | 5/2018 | Keegan | ..................... B62B 3/02 |
| 2023/0174131 | A1* | 6/2023 | Hanna | .................. B62B 3/0643 |
| | | | | 280/79.11 |

* cited by examiner

MODULAR EXTENDABLE TROLLEY

BACKGROUND OF THE INVENTION

1. Field of the Invention

The present invention relates to an innovative modular extendable trolley. The technical field of this type of trolley is that of the industry that uses specific industrial bins or collection means (also identified with the acronym "MDR"). Said collection means are transported along the production channels or assembly lines by means of trolley trains, motorized or pushed by hand and in any direction of travel.

2. Brief Description of the Prior Art

In the state of the art, trolleys are known for the transport of standard-sized industrial bodies. Usually, these trolleys are also used for the transport of MDRs of larger dimensions than the norm, both in length and in height and even larger than the trolley itself. These situations therefore entail significant disadvantages from the point of view of the stability of the MDRs on the trolley and consequently of the safety of the personnel handling these trolleys.

Since therefore the MDRs to be transported have different dimensions, said trolleys must be able to vary their dimensions according to the industrial MDR to be transported. Furthermore, it is important that these carriages can be easily maneuvered in any direction.

Joinable and modular extendable trolleys, which are extremely easy to handle, able to change size and direction of travel easily and extremely efficiently, while maintaining their characteristics of robustness and extreme maneuverability, are also not known.

Therefore, there is a need to define a modular trolley that can be extended in two sizes, so as to be able to safely and easily support and transport industrial MDRs of multiple sizes, keeping their weight evenly distributed on the trolley that carries them.

The modular extendable trolley object of the present invention also reduces the investments for its purchase as, being adjustable in two dimensions, it is extremely versatile and therefore allows its use in multiple ways, consequently requiring its purchase in small quantities. Furthermore, for the same reasons just explained, it requires reduced storage space.

SUMMARY OF THE INVENTION

The object of the present invention is therefore to offer a modular trolley characterized in that it can be extended in both dimensions in an extremely simple and efficient way. Furthermore, the modular trolley, thanks to its specific characteristics, allows various configurations of the same.

The object of the present invention solves the technical problem of the impossibility of modifying the dimensions of a trolley for the transport of industrial MDRs of multiple dimensions.

Advantageously, the modification of the dimensions of the innovative modular trolley takes place in an extremely simple way by means of mechanisms integrated within the structure of the trolley itself. Such mechanisms, of a known type, can be, for example, worm screw mechanisms, gear wheels, or articulated rod-crank systems. Furthermore, the modules that make up the modular trolley are easily interchangeable depending on the configuration required for transporting the MDRs.

These and other purposes and advantages are achieved, according to the invention, by a modular extendable trolley, having the characteristics set out in the attached independent claim.

Further preferred and/or particularly advantageous ways of carrying out the invention are described according to the characteristics set out in the annexed dependent claims.

BRIEF DESCRIPTION OF THE DRAWINGS

The invention will now be described with reference to the attached drawings, which illustrate an example of non-limiting implementation, in which.

DETAILED DESCRIPTION OF THE PREFERRED EMBODIMENTS

Figure 1:
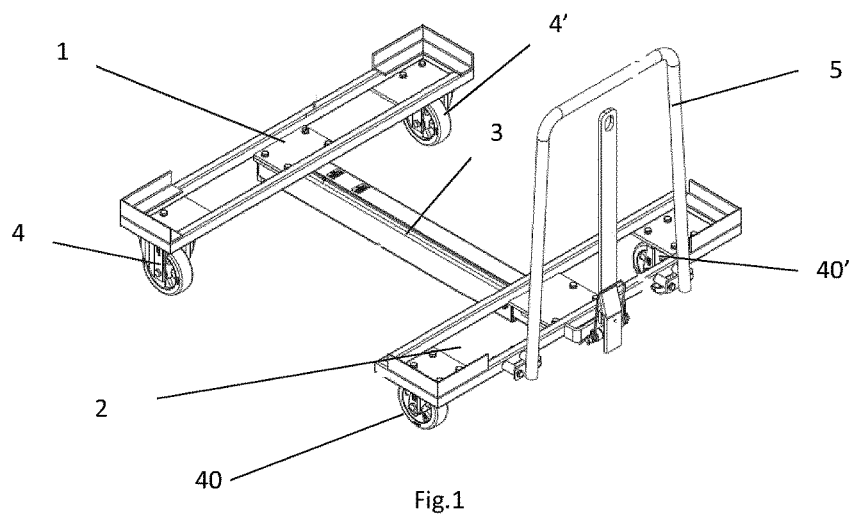
FIG. 1 is an axonometric overall view of the modular trolley in a closed configuration according to an embodiment of the present invention.

With reference to the above figures, the present invention relates to an modular extendable trolley 100 comprising a front module 1 of the loading and unloading surface, a rear module 2 of the loading and unloading surface, said modules 1, 2 being joined together by a module connection 3, preferably but not exclusively of the telescopic type, and four wheels 4, 40, 4', 40' for its movement. In particular, the two front wheels 4, 4' are connected to the front module 1 of the loading and unloading surface and the two rear wheels 40, 40' to the rear module 2 of the loading and unloading surface. The four wheels 4, 40, 4', 40' can be of various types: fixed, pivoting, braking and similar.

Figure 8:
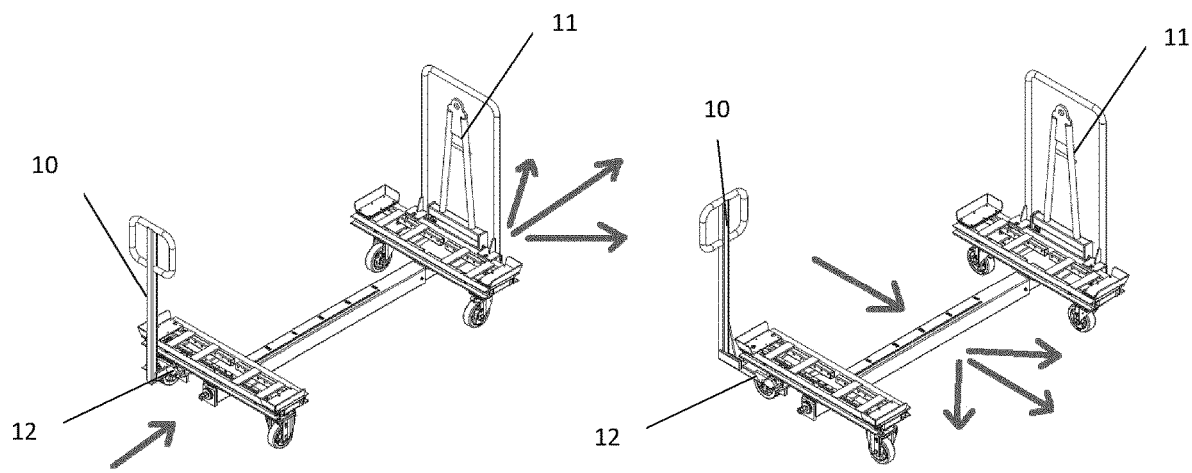
FIGS. 8A and 8B show an axonometric view of the lateral translation mechanism of the modular trolley of FIG. 1.

Advantageously, as shown in FIGS. 8A and 8B, the front wheels 4, 4' are free to move in a pivoting way, while the two rear wheels 40, 40' follow the direction of travel; the latter can also be steered.

The modular trolley 100 also includes a plurality of accessories, for example a push handle 5 of any shape or size, a drawbar 10 for directing the movement of the trolley and a tow hook 11 of any shape or size for hooking of a further trolley 100 or an electric locomotive, for the movement by a train of trolleys.

In an embodiment of the present invention, the trolley 100 comprises a translation unit 12 operated by a pedal located in the lower part of the drawbar 10 by means of which it is possible to change the direction of travel of the trolley 100, i.e. it is possible to rotate 90° the trolley 100 both forward and backward, both to the right and to the left. In this position rotated by 90°, the trolley 100 is used exclusively by hand.

Advantageously, the trolley 100 can be moved transversely with a single maneuver so that it can be easily positioned even in work areas with reduced movement spaces or restricted areas. The steering of the trolley 100 is carried out without moving it.

Figure 9:
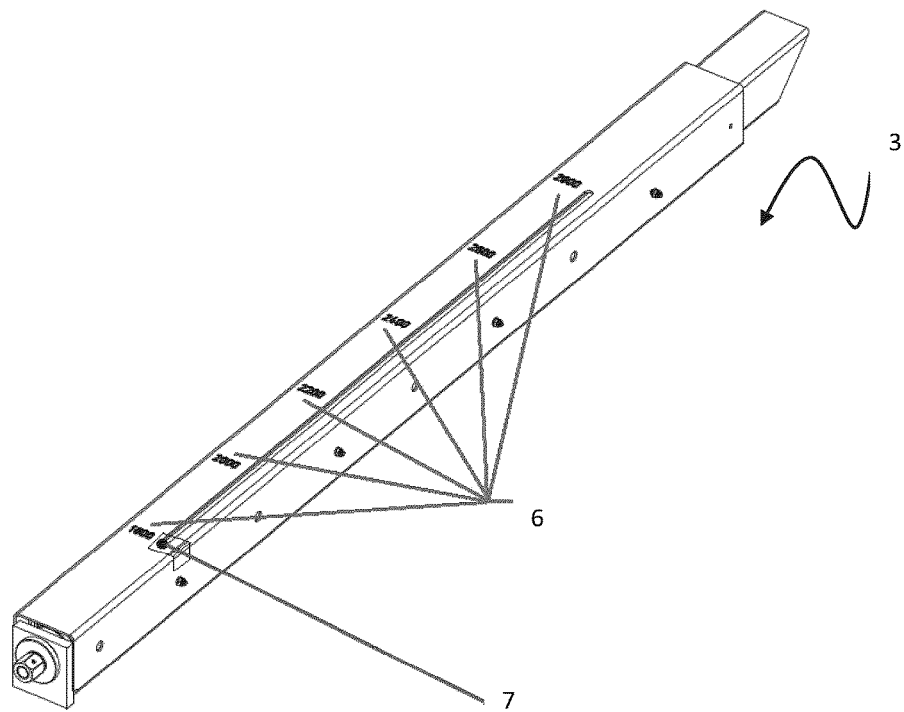
FIG. 9 shows a detail of the mechanism of FIG. 2.
Figure 10:
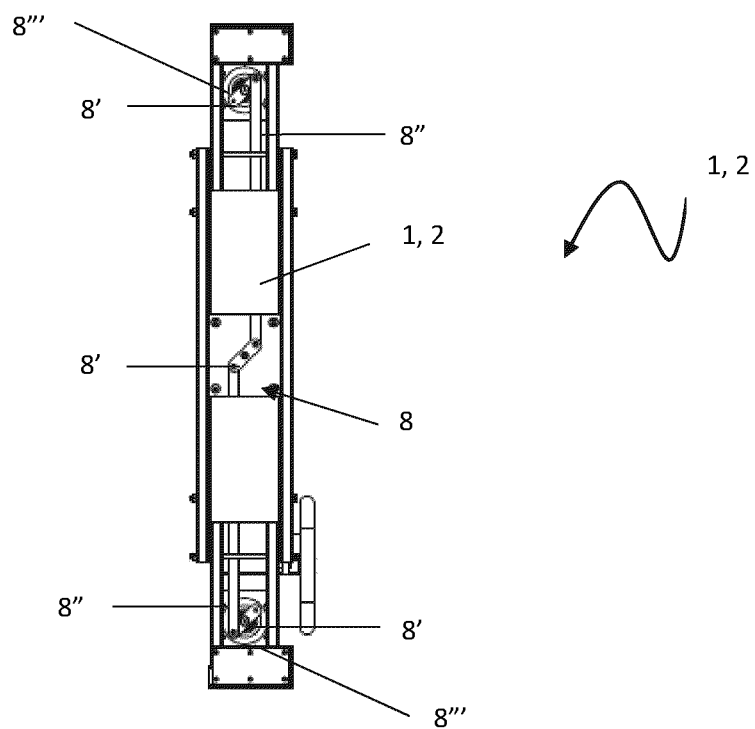
FIG. 10 is a view of the lateral extension mechanism of the modular trolley according to the present invention.

Furthermore, the connection module 3, as shown in FIG. 9, comprises a position reader 6 and a dimensional scale 7 for the precise determination of the extension length of the module 3 itself.

Throughout the present description, the front side of the trolley 100 means the proximal side with respect to the front module 1 of the loading and unloading surface, where the drawbar 10 and/or the push handle 5 is positioned, while the rear side is the one distal to the front module 1 of the loading and unloading surface. On the other hand, the left and right sides of the trolley 100 will be understood to mean those respectively corresponding to the limbs of an operator located behind the trolley and holding the push handle 5. In the absence of the drawbar or the push handle, the front side it is the one in which the pivoting wheels are positioned.

Figure 2:
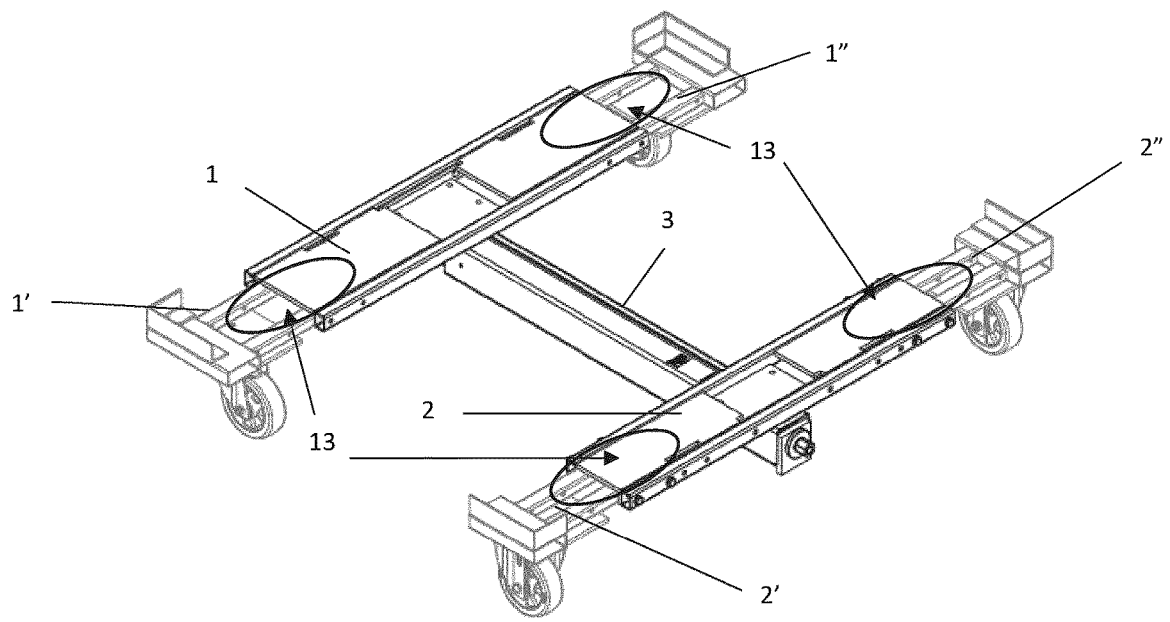
FIG. 2 is an axonometric view of the modular trolley of FIG. 1, extensible along a Y axis.

As shown in FIG. 2, the front module 1 of the loading and unloading surface and the rear module 2 of the loading and unloading surface have a support surface 13 near the right and left side end portions, which together with the wheels 4, 40, 4', 40' determine the capacity of the trolley 100 in Kg. The capacity of the trolley is therefore determined by the capacity of the wheels 4, 40, 4', 40' used, depending on the specific needs.

The front module 1 of the loading and unloading surface comprises a first portion 1' and a second portion 1" and the rear module 2 of the loading and unloading surface comprises a first portion 2' and a second portion 2" which are capable of extend laterally along a first Y axis, increasing or decreasing its size according to the needs of use.

The extension of the portions 1' 1" of the front module 1 and of the portions 2' and 2" of the rear module 2 along the first Y axis is achieved by means of articulated mechanical systems of a known type and therefore not shown in the attached figures, for example worms, gear wheels and levers, positioned inside the modules which allow for easy extensibility.

Figure 6:
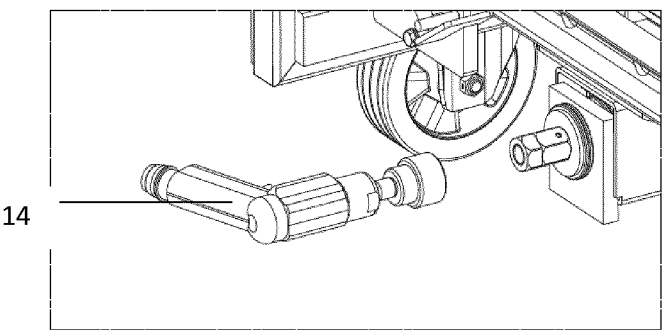
FIG. 6 shows a detail of the operating mechanism of the modular trolley, according to the present invention.
Figure 7:
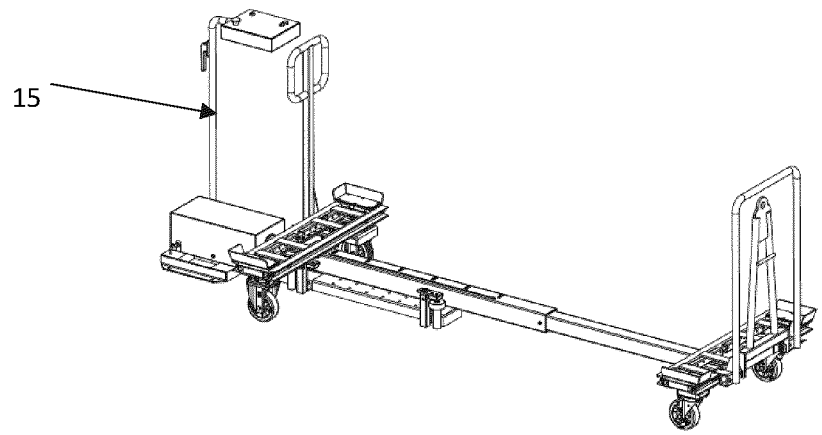
FIG. 7 shows a station for hooking the trolley according to the present invention.

The movement of the mechanical systems can be manual or mechanical, with the help, for example of battery-operated tools 14 such as a drill or screwdriver with a special bush as shown in FIG. 6, or by means of a special station 15 for docking the trolley, equipped with electrically operated gear-motors, which interacts directly with the trolley 100 positioned above it, as shown in FIG. 7.

According to an embodiment of the present invention, the extension of the lateral portions 1", 1" and 2", 2", includes a plurality of crank elements 8" and mechanisms 8", articulated together. The end cranks 8" are articulated with rotating elements (handle) which in turn are connected to the wheels 4, 4' and which can be easily moved by releasing the pedal, which maintains the direction of travel of the trolley 100. The cranks have a length that can be adjusted by means of holes arranged to make it change the size according to the desired width (along a first Y axis), and by a screw adjustment that creates the correct set-up of the wheels 4, 40, 4', 40' during the travel. The kinematic and dimensional properties are manifold by varying the initial dimensions of the groups.

Advantageously, the trolley 100 can be extended both along the first Y axis and along the second X axis, allowing the easy and safe loading of MDRs of multiple sizes.

Figure 3:
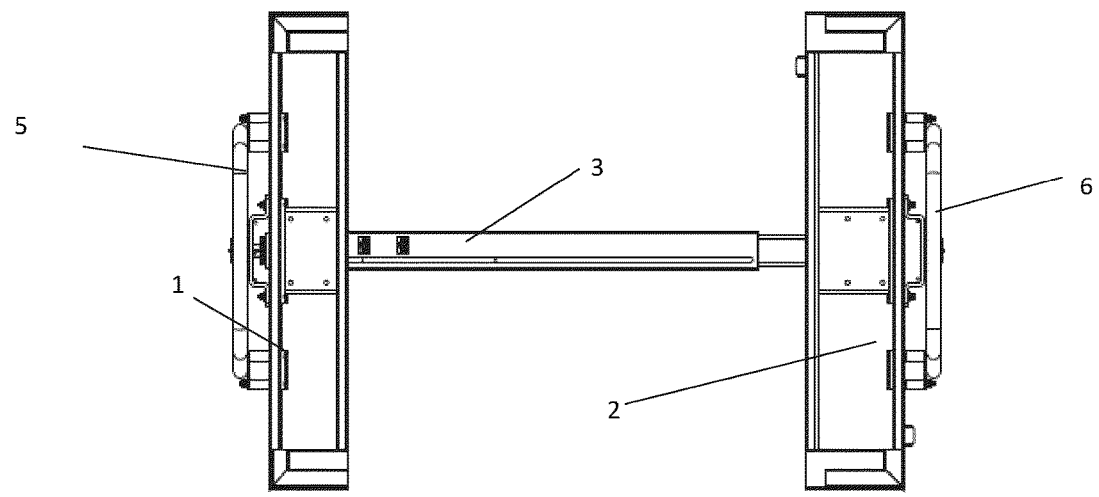
FIG. 3 is a plan view of the modular trolley of FIG. 1 in a closed configuration.
Figure 4:
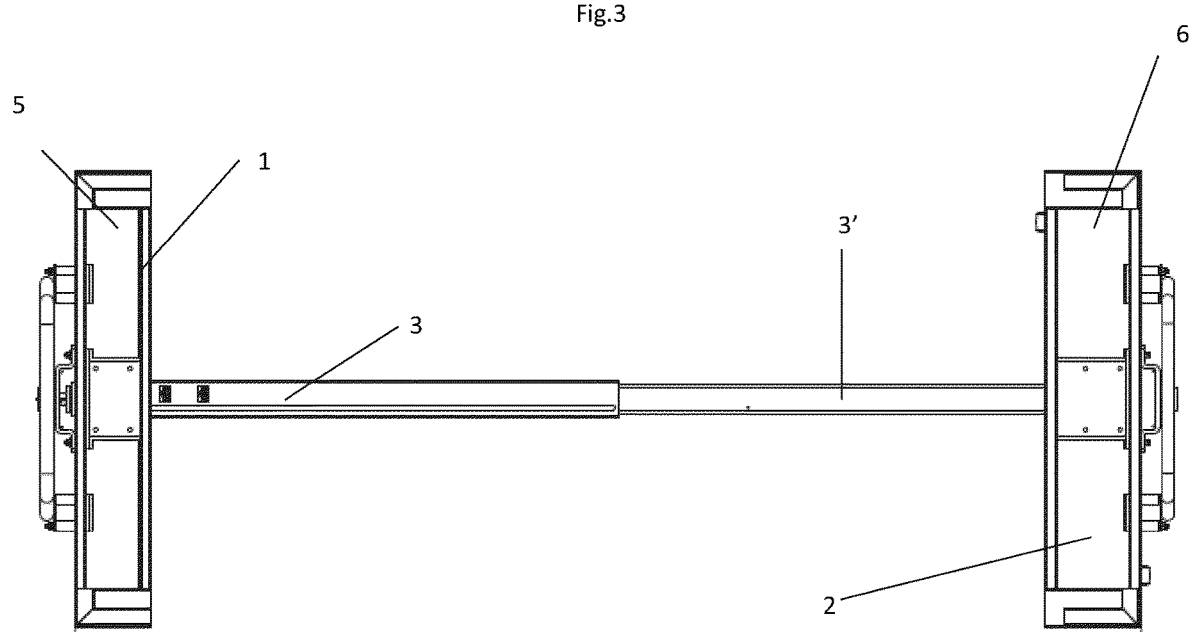
FIG. 4 is a plan view of the modular trolley of FIG. 1, in an open configuration, extensible along an X axis.
Figure 5:
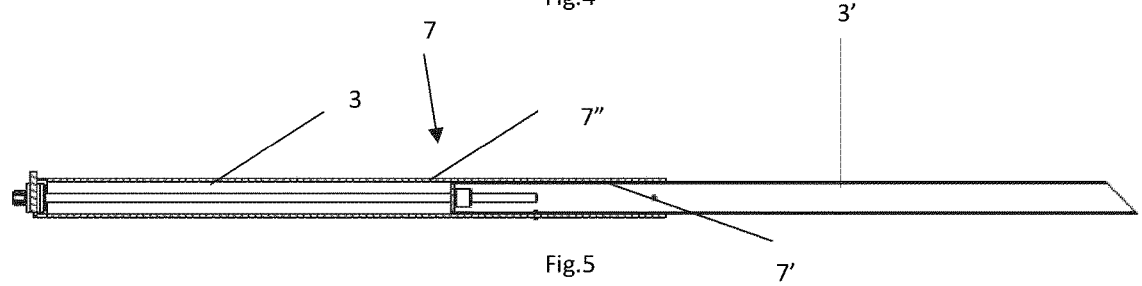
FIG. 5 is a section view of the extension mechanism along the X axis of the central portion of the modular trolley in FIG. 1.

As shown in FIGS. 3 and 4, the connection module 3 between the front module 1 and the rear module 2 of the loading and unloading surface of the trolley 100 is also extendable. The connecting module 3 is a telescopic arm, comprising an extendable portion 3'. As shown in FIG. 5, the elongation of the extensible portion 3' along the second axis X, as well as the elongation of the portions of the extensible portions 1', 1" of the front module 1 and of the extensible portions 2' and 2" of the module rear 2 along the first Y axis is made by moving a worm screw mechanism 7 comprising a pair of elements that mesh with each other, that is a screw element 7' and a nut screw element 7". The worm screw mechanism can be easily moved for example by inserting a removable crank at one end of the worm screw mechanism or by means of a simple electric, pneumatic, air screwdriver, or any other means of a known type suitable for performing this function or by means of the trolley docking station 15.

The variation of the overall length of the trolley by means of the station 15 is convenient and easy to perform, it also allows to control the travel made by the position reader 6 on the dimensional scale 7. The maximum dimensions of each configured trolley are placed on the dimensional scale 6 and identify the maximum measurements of each trolley.

Although at least one exemplary embodiment has been presented in the summary and detailed description, it must be understood that there is a large number of variants within the scope of the invention. In addition, it must be understood that the realization or realizations presented are only examples that do not intend in any way to limit the scope of protection of the invention or its application or its configurations. Rather, the brief and detailed description provide the skilled technician in the field with a convenient guide for implementing at least one exemplary embodiment, being clear that numerous variations can be made in the function and assembly of the groups described herein, without departing from the scope of protection of the invention as established by the attached claims and their technical-legal equivalents.

The invention claimed is:

1. A modular extendable trolley (100) including: a front module (1) of a loading and unloading floor; a rear module (2) of the loading and unloading floor; a connection module (3) between the front module (1) and the rear module (2): four wheels (4, 40, 4', 40') to move the trolley; a drawbar (10) to direct the trolley; a tow hook (11) for hooking an additional trolley into a train of trolleys, the trolley (100) being characterized in that said front module (1) and said rear module (2) of the loading and unloading floor comprises extensible side portions (1', 1", 2', 2") and said connection module (3) comprises a longitudinal portion (3') extendable to vary the dimensions of the trolley (100); and wherein the extensible side portions (1', 1", 2', 2") have an elongation made by an articulated system (8) positioned inside the font module (1) and the rear module (2) of the loading and unloading floor; and wherein the articulated system (8) comprises a plurality of crank elements (8') and a plurality of end crank elements (8") articulated together.

2. The trolley (100) according to claim 1, also comprising a push handle (5) of the trolley and the drawbar (10) to draw the direction to the trolley.

3. The trolley (100) according to claim 1, wherein the front module (1) and the rear module (2) of the loading and unloading floor comprise a support surface (13) near the right and left side end portions.

4. The trolley (100) according to claim 1, wherein the connection module (3) comprises a position reader (6) and a dimensional scale (7) for determining the extension length of the module (3) itself.

5. The trolley (100) according to claim 1, wherein the crank elements (8') are articulated to end crank elements (8") which are moved by inserting a removable crank or a tool (14) at one end thereof or by means of a docking station (15).

6. The trolley (100) according to claim 1, wherein the elongation of the extendable portions (1', 1") of the front module (1) and the elongation of the extendable portions (2' and 2") of the rear module (2) along a first axis (Y) and the elongation of the extendable portion (3') of the connection module (3) along a second axis (X) is made by a worm screw mechanism (7) comprising a screw element (7') and a nut screw element (7") that mesh with each other.

\* \* \* \* \*